Sept. 8, 1970     E. M. MUHLECK     3,527,115
GEAR SHIFT CONTROL ARRANGEMENT
Filed April 14, 1969     2 Sheets-Sheet 1
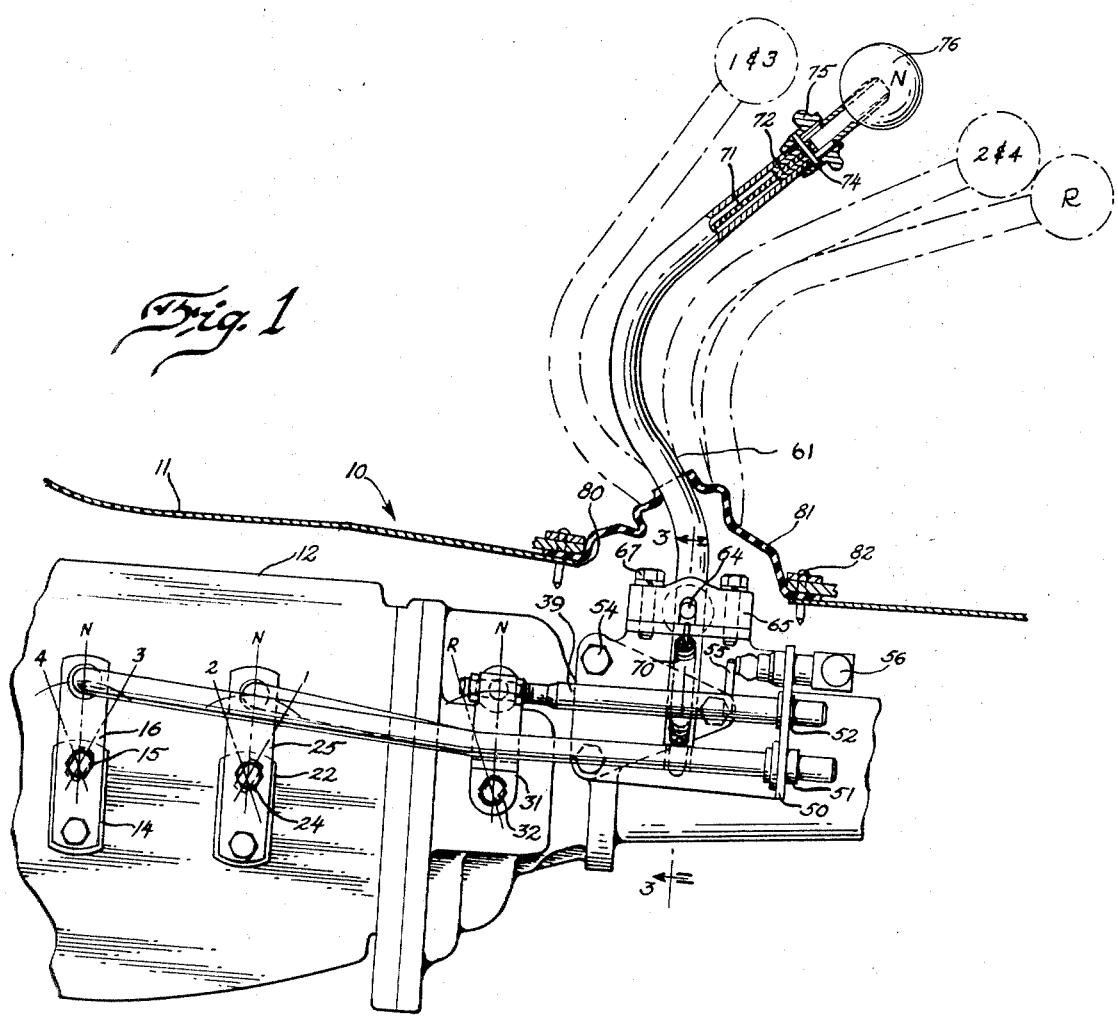
Inventor,
EARL M. MUHLECK
By
Barbee & Latta
Attorneys Sept. 8, 1970     E. M. MUHLECK     3,527,115
GEAR SHIFT CONTROL ARRANGEMENT
Filed April 14, 1969     2 Sheets-Sheet 2
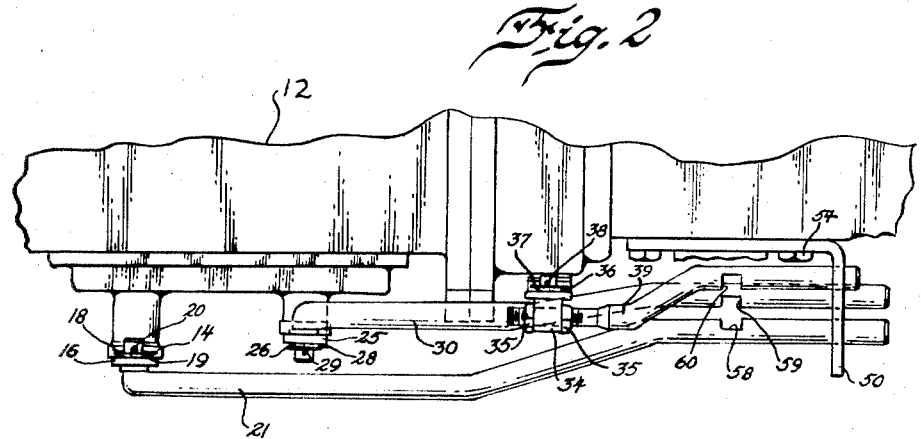
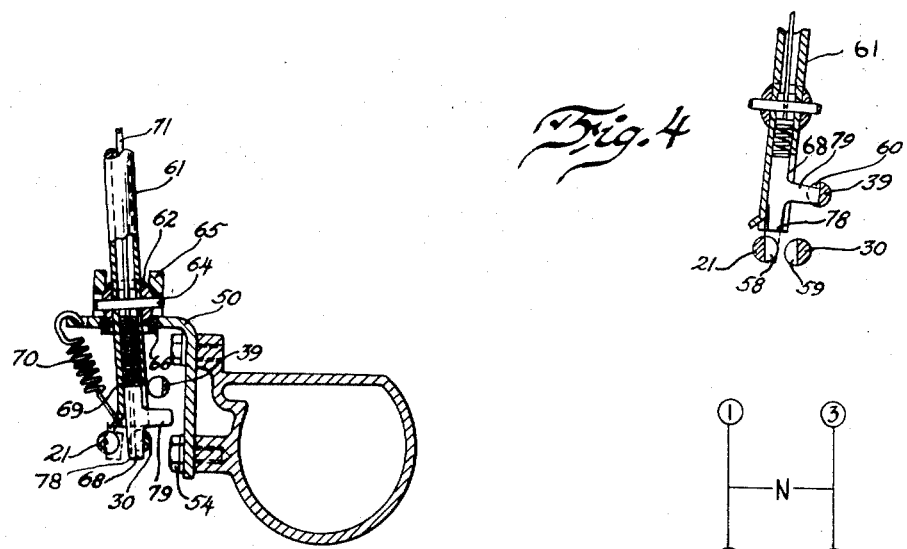
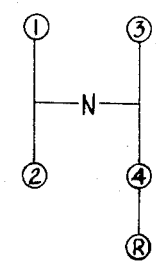
Inventor,
EARL M. MUHLECK
By Barbee & Latta
Attorneys

United States Patent Office 3,527,115
Patented Sept. 8, 1970

3,527,115
GEAR SHIFT CONTROL ARRANGEMENT
Earl M. Muhleck, Detroit, Mich., assignor to American Motors Corporation, Kenosha, Wis., a corporation of Maryland
Filed Apr. 14, 1969, Ser. No. 815,804
Int. Cl. G05g 9/12
U.S. Cl. 74—476　　　　　　　　　　　　　10 Claims

ABSTRACT OF THE DISCLOSURE

An arrangement for shifting the gears of a multi-speed transmission having three externally mounted control levers. The control levers are connected to shifter shafts and associated shift forks for gear selection located inside the transmission housing. The arrangement includes three rods, each of which is pivotally connected to a control lever and slidably mounted on a bracket adapted to be attached to the transmission housing. The rod for reverse gear operation is preferably located above the other two rods. Also included in the arrangement is an operator's shift lever pivotally mounted on the bracket and having a selector slidably mounted thereon which is adapted to directly engage detents in the two lower rods to move same for gear selection and a detent in the upper rod for reverse gear selection.

BACKGROUND OF THE INVENTION

Field of the invention

This arrangement pertains to gear shift control arrangements for vehicle transmissions.

Description of the prior art

The conventional gear shift mechanism for a vehicle transmission having three control levers located on the transmission is also mounted thereon and not on the steering column and has the operator's shift lever extending through the floor of the vehicle and into the passenger compartment. Due to the three control levers involved, the transmission is called a four speed transmission with four speeds forward and one in reverse. Included in the mechanism is a support bracket adapted to be attached to the transmission housing and a selector shaft slidably mounted on the bracket. Three levers are also mounted on the selector shaft and each lever is connected to a control lever located on the transmission housing by a suitable rod. The operator's shift lever is in turn connected to the selector shaft for axial and rotational movement of same by means of an upper fulcrum composed of a crowned part of the shift lever in conjunction with a wall of the bracket. The selector shaft has suitable means to selectively engage each lever when moved axially. To prevent inadvertent engagement of the reverse lever, a blocking element is provided which must be pulled up against spring tension to enter an opening in the bracket prior to selecting the reverse lever.

While the above described gear shift mechanism has been in use for some time, it has the disadvantage of requiring considerable effort to operate. Also a considerable number of parts are involved which increases the cost.

SUMMARY OF THE INVENTION

Applicant has designed a gear shift control arrangement which dispenses with many of the components of the conventional four speed shift mechanism thereby reducing the cost and the operating effort. Specifically, applicant has provided a bracket adapted to be mounted on a vehicle transmission and having slidable mounting provisions therein for three rods with preferably two rods located below the reverse gear rod. The bracket also has an upper pivotal mounting arrangement for the operator's lever which extends therefrom into the passenger compartment. The operator's lever is mounted for movement in a forward plane and a plane transverse thereto. The lever has a selector slidably mounted thereon which is adapted to directly engage detents in either of the two lower rods when the lever is moved in the transverse plane. Movement in the forward plane by the lever will move the selected rod and the connected control lever to select the gear in the transmission. Should the detents for both rods be selected by positioning the selector midway therebetween, the rods cannot be moved simultaneously due to the geometry of a conventional interlock located in the transmission. The selector will also engage the detent of the upper rod to select reverse gear when pulled up into contact therewith.

A further feature of applicant's design worthy of note is the dual purpose ascribed to the selector. The selector is constructed to have one portion engage the detents of either of the two lower rods and a second portion the detent of the upper reverse rod. The second portion in conjunction with the upper rod will block upward movement of the selector from the first and second gear rod detent in all positions including the neutral position. The second of the selector will also block upward movement of the selector from the third and fourth gear rod detent except in the neutral position. Thus the selector must have the one portion engage the detent in the third and fourth gear rod in the neutral position before the selector can be pulled up to have the second portion engage the detent of the upper rod to select reverse gear.

Although the shift sequence as commonly marked on the knob of the operator's shift lever follows the conventional "H" pattern with first and third gear forward and second and fourth gear rearward, the reverse gear is in line with the fourth gear and rearward instead of being located laterally therefrom and adjacent the first and second gear. No legal requirements are known for the location of reverse gear in the typical sequence listed above.

Due to the single, low capacity spring which biases the operator's shift lever toward the third and fourth gear rod detent, little effort is required to engage the desired rod detents as compared to axially moving a selector shaft against a strong spring with even greater effort required to select reverse gear. Applicant's "pull-up" selector also utilizes only a low capacity spring which can be compressed only when the operator's shift lever is in neutral and the selector is in the third and fourth gear rod detent. Due to the low effort, the speed of shifting gears is also enhanced. Also, transmission warranty costs are reduced as the whole arrangement is located outside of the transmission.

It is therefore an object of this invention to provide a new and improved gear shift control arrangement.

Another object of this invention is to provide a low effort, gear shift control arrangement for a four speed vehicle transmission that is particularly economical to manufacture.

BRIEF DESCRIPTION OF THE DRAWINGS

FIG. 1 is a side elevational view of the gear shift control arrangement of this invention mounted on a vehicle, with the vehicle being cut away in the interest of clarity;

FIG. 2 is a plan view of the arrangement showing the rods and associated detents in the neutral position with portions of the arrangement cut away in the interest of clarity;

FIG. 3 is a sectional view taken along line 3—3 of FIG. 1 showing the selector in engagement with the detent of the first and second gear rod, the broken line position showing the selector in engagement with the detent of the third and fourth gear rod;

FIG. 4 is a view similar to FIG. 3 but showing the selector in engagement with the detent of the reverse gear rod; and FIG. 5 is a view of the shift sequence that would be placed on the operator's shift lever knob.

DESCRIPTION OF THE PREFERRED EMBODIMENT

Referring to FIGS. 1 and 2, 10 indicates a vehicle having a floor pan 11 and a transmission 12. Transmission 12 is attached to a conventional clutch housing (not shown). Transmission 12 is a conventional four speed transmission having four speeds forward and a reverse. Inner transmission control lever 14 is connected to shifter shaft 15 which extends into the transmission and utilizes a rectangular connection therewith to transmit motion to shaft 15 to actuate the connected shift fork (not shown). Outer control lever 16 is connected to inner lever 14 by suitable bolts and nuts. Lever 16 is shown in the neutral position. The forward broken line indicating the lever position for fourth gear and the rearward broken line indicating the position for third gear. Also connected to lever 16 by plate washer 18, spring washer 19 and cotter pin 20 is rod 21. The spring washer helps absorb any misalignement developed during movement of rod 21.

Inner transmission control lever 22 is connected to shifter shaft 24 in similar fashion as lever 14. Outer transmission control lever 25 is connected to lever 22 in like manner as lever 16. Lever 25 is shown in the neutral position. The forward broken line position indicating the lever position for second gear and the rearward broken line position for first gear. Also connected to lever 25 by plate washer 26, spring washer 28 and cotter pin 29 is rod 30.

Transmission control lever 31 is connected to shifter shaft 32 in a similar manner as lever 14, however no inner and outer lever arrangement is utilized. Lever 31 is shown in the neutral position. The forward broken line position indicating the lever position for reverse gear. Also connected to lever 31 by trunnion 34, nuts 35, spring washer 36, plate washer 37 and cotter pin 38 is rod 39.

As best shown in FIG. 1, rods 21, 30 and 39 are slidably mounted in support bracket 50 via plastic bushings 51 and 52. Bracket 50 is attached to transmission 12 by capscrews 54. Rod 39 which is connected to reverse gear control lever 31 is mounted above rods 21 and 30. Rod 39 also has pin 55 projecting therefrom. Pin 55 is in contact with conventional back up light switch 56 which is also located on bracket 50. Movement of rod 39 and therefore pin 55 from contact with switch 56 energizes same to light a back up light when the vehicle is in reverse gear. Rods 21, 30 and 39 also have detents 58, 59 and 60 respectively located therein.

As shown best in FIGS. 1 and 3, mounted on bracket 50 is the operator's shift lever 61. Shift lever 61 is shown in solid lines in the neutral position in FIG. 1. The forward broken line position indicating the lever position for first and third gear, the rear broken line position for second and fourth gear and the remaining position for reverse gear. Lever 61 has a steel ball 62 located thereon intermediate its ends. Steel ball 62 has a shaft 64 extending therethrough and also through openings in plastic cap 65. Cap 65 has a generally spherical surface to complement ball 62. Plastic insert 66 mounted in bracket 50 also complements the surface of ball 62. Capscrews 67 connect cap 65 to bracket 50. As shown in FIG. 3, it is clearly apparent that lever 61 by means of its pivotal connection between ball 62, cap 65 and insert 66 can be moved in one plane and in a plane substantially transverse thereto. Shaft 64 in conjunction with slotted openings in cap 65 restricts the amount of movement in the transverse plane.

Shift lever 61 also has a selector means 68 slidably mounted in its lower extremity, selector means 68 is biased downward by spring 69 located in shift lever 61. Spring 70 extending between bracket 50 and an upraised tab of lever 61 biases same toward rod 21 for third and fourth gear selection. Also attached to selector 68 by welding or the like is cable 71 which extends upward and preferably through a suitable opening in shaft 64 to engagement with bushing 72. Pin 74 extends through lever 61 via slotted holes and also through bushing 72 and is eventually connected to collar 75. Collar 75 is slidably mounted on lever 61. Knob 76 threaded on to shift lever 61 has the shift sequence noted thereon as shown in FIG. 5.

Selector means 68 as shown best in FIGS. 3 and 4 has a lower portion 78 and an upper portion 79. Lower portion 78 is adapted to engage detent 58 of rod 21 or detent 59 of rod 30. Upper portion 79 is adapted to engage detent 60 of rod 39.

Lever 61 extends through opening 80 in floor pan 11 which may be sealed by rubber boot 81 attached to floor pan 11 by self tapping screws 82. Although a boot is not shown for the lower part of the arrangement, same could be provided if the transmission body mount (not shown) does not keep therefrom dirt and water.

In operation, and as best shown in FIGS. 1, 2 and 3, shift lever 61 is initially in the neutral position with detents 58, 59 and 60 aligned. Spring 70 wil bias shift lever 61 and therefore selector means 68 (shown in broken lines) to engage detent 58 in third and fourth gear rod 21. This promotes ease of shifting between third and fourth gear. Spring 69 also biases selector means 68 toward either detent 58 or 59. With detent 58 engaged, lower portion 78 of selector means 68, upon movement of shift lever 61 rearward via the pivotal mounting will move rod 21 forward and consequently lever 16 to select fourth gear. Forward movement of lever 61 will select third gear. Upon return to the neutral position and moving shift lever 61 to the left against spring 70 in a transverse plane, lower portion 78 of selector means will engage detent 59. Rearward movement of the lever via the pivotal mounting will move rod 30 and therefore lever 25 forward to select second gear. Forward movement of lever 61 will select first gear.

To shift to reverse gear requires returning lever 61 to the neutral position. Spring 70 will then cause lower portion 78 to engage the detent 58 of rod 21. By pulling up on collar 75 against spring 69, lower portion 78 is moved from detent 58 and upper portion 79 enters detent 60 of rod 39. Movement of shift lever rearward then causes rod 39 and lever 31 to move forward to select reverse gear.

From a viewing of FIG. 3, it is clearly apparent that collar 75 and therefore portion 78 of selector means 68 cannot be moved from engagement with detent 59 of first and second gear rod 30 when same is in any position including neutral because of the interaction of rod 39 and upper portion 79 of selector means 68. Thus there can be no inadvertent selection of reverse gear when shifting between first gear and reverse which is the most common procedure. Only when lower portion 78 of selector means 68 is engaging detent 58 of third and fourth gear rod 21 and same is in the neutral position, can collar 75 be moved upward to select reverse gear. Thus for all forward speeds, collar 75 need not be actuated while shifting up or down between gears, and inadvertent selection of reverse gear is effectively prevented.

Having thus described the invention it will be apparent to those skilled in the art that various modifications and changes can be made without departing from the spirit of the invention or the scope of the appended claims.

What is claimed is:

1. A gear shift control arrangement for a multi-speed transmission, said arrangement comprising:
    (a) a support adapted to be mounted on the exterior of the transmission;
    (b) three rods movably mounted on said support, one of said rods being mounted above the other rods, each of said rods being adapted to be pivotally connected to an external transmission control lever, each of said rods having a detent means;

(c) a shift lever mounted on said support for pivotal movement in substantially one plane and in a second plane transverse to said one plane, and (d) selector means slidably mounted in said shift lever, said selector means being adapted to engage detent means in either of the other rods upon movement of said shift lever in said second plane, and upon movement of said shift lever in said one plane moving the selected rod to select a gear in the transmission, said selector means also being adapted to engage the detent means of said one rod when said selector means is raised for contact therewith for movement in said one plane.

2. The gear shift control arrangement of claim 1 in which said selector means has one portion adapted to engage said detent means in either of said other rods and a second portion adapted to engage said detent means of said one rod, said second portion in conjunction with said one rod blocking inadvertent upward movement of said selector means from said other rods.

3. The gear shift control arrangement of claim 2 in which said detent means of said other rods face each other with said one portion of said selector means extending therebetween when not engaged with either detent means.

4. The gear shift control arrangement of claim 3 further comprising first spring means for biasing said one portion of said selector means into said detent means of a rod of said other rods.

5. The gear shift control arrangement of claim 4 furthere comprising second spring means for biasing said second portion of said selector means away from contact with said detent means of said one rod.

6. A gear shift control arrangement for a multi-speed transmission, said arrangement comprising:

(a) a support adapted to be mounted on the exterior of the transmission;

(b) three rods movably mounted on said support, one of said rods being mounted above the other rods, said one rod being adapted to be connected to the reverse gear control lever externally mounted on the transmission, the second rod being adapted to be connected to the first and second gear control lever externally mounted on the transmission, the third rod being adapted to be connected to the third and fourth gear control lever externally mounted on the transmission, each of said rods having a detent means;

(c) a shift lever mounted on said support for pivotal movement in substantially one plane and in a second plane transverse to said one plane; and (d) selector means slidably mounted in said shift lever, one portion of said selector means being adapted to engage the detent means in either the second or third rods when said shift lever is moved in said second plane, and upon movement in said one plane moving the selected rod to select a gear in the transmission, said selector means also having a second portion adapted to engage the detent means of said one rod when said selector is raised for contact therewith for movement in said one plane.

7. The gear shift control arrangement of claim 6 in which said second portion of said selector means in conjunction with said one rod blocks inadvertent, upward movement of said selector means from said second and third rods.

8. The gear shift control arrangement of claim 7 in which said second portion of said selector means in conjunction with said one rod blocks upward movement of said selector means from said second rod.

9. The gear shift control arrangement of claim 8 in which said second portion of said selector means in conjunction with said one rod blocks upward movement of said selector means from said third rod except when the detent means of said third rod and said one rod are aligned.

10. The gear shift control arrangement of claim 9 in which said selector means includes a cable attached thereto, said cable extending through said shift lever and connected to a collar slidably mounted on said lever remote from said selector means, movement upward of said collar causing said selector means to move, and said second portion to engage the detent means of said one rod, and further comprising first spring means for biasing said one portion of said selector means into the detent means of said third rod and second spring means for biasing said second portion away from contact with said detent means of said one rod.

References Cited

UNITED STATES PATENTS

| 2,615,346 | 10/1952 | Simpson et al. | 74—473 X |
| 3,106,851 | 10/1963 | Ivanchich | 74—477 X |
| 3,229,547 | 1/1966 | Hill | 74—477 X |

MILTON KAUFMAN, Primary Examiner

U.S. Cl. X.R.

74—477